No. 646,473. Patented Apr. 3, 1900.
M. E. STACY.
BICYCLE TIRE.
(Application filed Sept. 20, 1899.)
(No Model.)
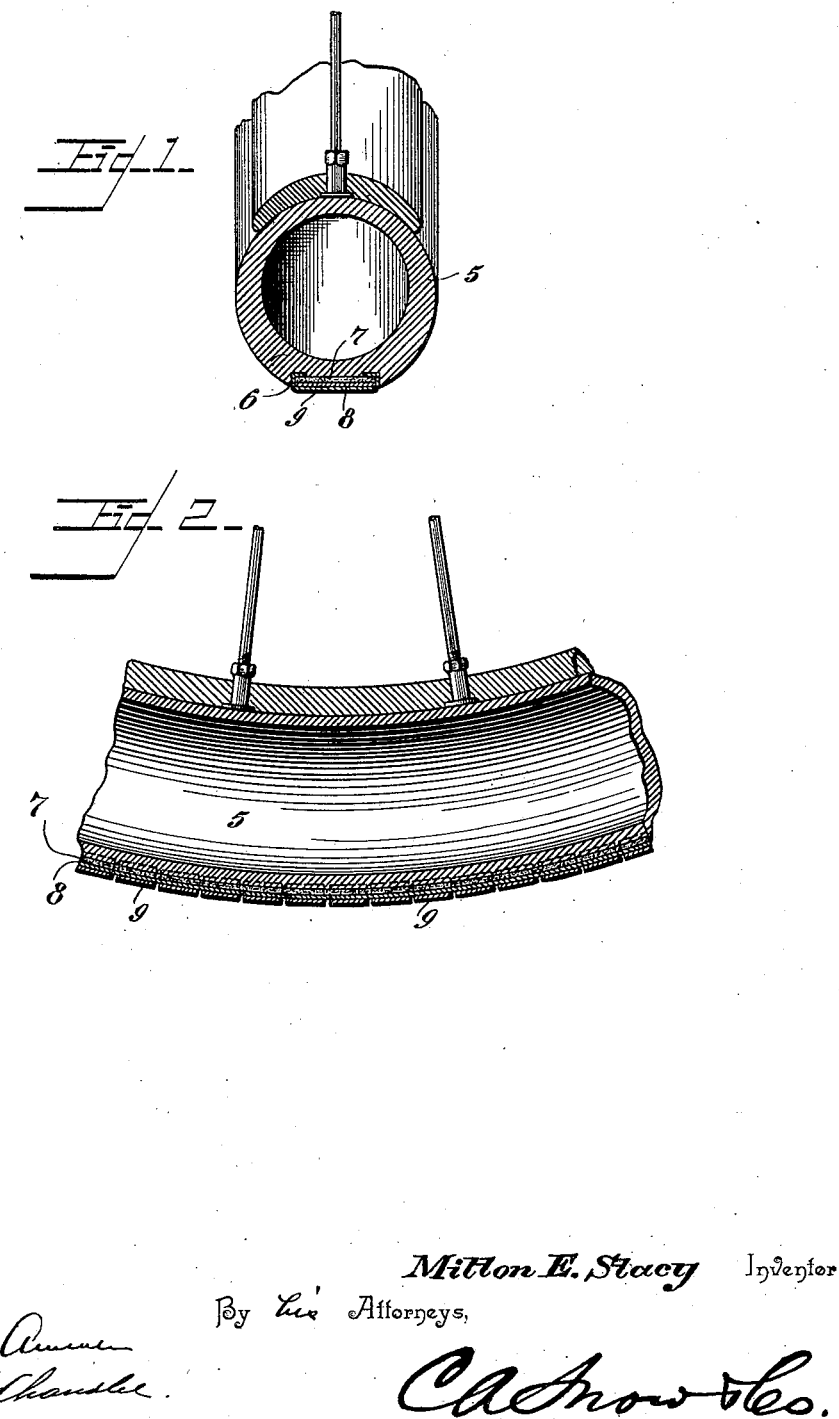
Witnesses
Milton E. Stacy Inventor
By his Attorneys,

UNITED STATES PATENT OFFICE.

MILTON E. STACY, OF BOSTON, GEORGIA, ASSIGNOR TO FURNEY C. IVEY, OF SAME PLACE.

BICYCLE-TIRE.

SPECIFICATION forming part of Letters Patent No. 646,473, dated April 3, 1900.

Application filed September 20, 1899. Serial No. 731,121. (No model.)

*To all whom it may concern:*

Be it known that I, MILTON E. STACY, a citizen of the United States, residing at Boston, in the county of Thomas and State of Georgia, have invented a new and useful Bicycle-Tire, of which the following is a specification.

This invention relates to bicycle-tires; and it has for its object to so construct such a tire as to preclude the possibility of its becoming punctured and also to increase the traction between the tread of the tire and the roadbed over which it may pass in order that the liability of slipping may be decreased.

In the drawings forming a part of this specification, and in which like numerals of reference indicate like and corresponding parts in both views, Figure 1 is a transverse section of a portion of a bicycle-tire embodying this invention and showing adjacent parts. Fig. 2 is a longitudinal section of a portion of the bicycle-tire and the adjacent felly, connected spokes being shown in elevation.

Referring now to the drawings, 5 represents a pneumatic tube forming a portion of the bicycle-tire and which is of the usual endless construction and adapted for attachment to the felly of the wheel. This tire is formed, preferably, of rubber and may have any desired strengthening material incorporated therewith.

In the outer periphery of the tire 5, which forms the tread-surface, is formed a groove 6, extending throughout the circumference of the tire, and in this groove is seated a protecting-strip consisting of a flexible strap 7, preferably of leather, having upon its outer surface a metallic hoop 8, of steel or similar material, the hoop being held upon the strap by means of a series of U-shaped clips 9, passing transversely of the outer surface of the hoop and then inwardly across the side edges of the hoop and strap, and finally bent to lie upon the inner surface of the strap. These clips or plates are separated by slight interspaces from each other, and thus permit flexibility of the tire. It will thus be seen that in the employment of this protecting-strip the tire in operation will have nearly its usual flexibility, that the plates will increase the traction, and that the entire structure will provide an effective armor for the pneumatic tube.

It will be understood that in practice any desired materials may be employed for the different parts of the structure and that the dimensions of the strip may be varied without departing from the spirit of the invention.

In the manufacture of the construction it is intended that the pneumatic tube be molded with the peripheral groove therein and that the protecting-strip be then seated in the groove, after which the tire may be pumped up, when it will expand and cause a tight sealing of the strip.

In the bottom wall of the groove and adjacent the side walls thereof are formed additional grooves or recesses 15 and 16, which are continued throughout the extent of the groove and in which are seated the inturned ends of the plates. This construction affords a more firm seating of the strip and prevents lateral displacement.

Having thus described the invention, what I claim is—

1. A bicycle-tire comprising a tube having a peripheral groove, and a protecting-strip seated in the groove and comprising a flexible strap having plates passed transversely of the outer surface thereof and having their ends bent to lie upon the inner surface of the strap and between it and the bottom of the groove.

2. A bicycle-tire comprising a tube having a peripheral groove, recesses in the bottom of said groove and a protecting-strip seated in the groove and comprising a flexible strap having plates passed transversely of the outer surface thereof and having their ends bent to lie upon the inner surface of the strap and seated in said recesses.

In testimony that I claim the foregoing as my own I have hereto affixed my signature in the presence of two witnesses.

MILTON E. STACY.

Witnesses:
JNO. G. BURNEY,
JAMES C. ADAMS.